(12) United States Patent
Handel et al.

(10) Patent No.: US 7,937,330 B2
(45) Date of Patent: *May 3, 2011

(54) SYSTEM AND METHOD FOR OPTIMIZATION OF GROUP SHIPMENTS TO REDUCE SHIPPING COSTS

(75) Inventors: Sean Handel, Moss Beach, CA (US); Rick Hernandez, Palo Alto, CA (US); Mark Orttung, Menlo Park, CA (US); Shantanu Patwardhan, Cupertino, CA (US)

(73) Assignee: Rearden Commerce, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/354,692

(22) Filed: Jan. 15, 2009

(65) Prior Publication Data
US 2009/0125355 A1 May 14, 2009

Related U.S. Application Data (63) Continuation of application No. 11/187,484, filed on Jul. 22, 2005, now Pat. No. 7,496,520.

(51) Int. Cl.
*G06Q 30/00* (2006.01)
(52) U.S. Cl. ............................................ 705/330
(58) Field of Classification Search ................... 705/330
See application file for complete search history.

(56) References Cited

U.S. PATENT DOCUMENTS

| | | | |
|---|---|---|---|
| 5,191,523 A | 3/1993 | Whitesage | |
| 5,237,499 A | 8/1993 | Garback | |
| 5,319,542 A | 6/1994 | King et al. | |
| 5,331,546 A | 7/1994 | Webber et al. | |
| 5,475,740 A | 12/1995 | Biggs et al. | |
| 5,570,283 A | 10/1996 | Shoolery et al. | |

(Continued)

FOREIGN PATENT DOCUMENTS
CA 2291463 6/2001

OTHER PUBLICATIONS

Elliff, Scott, "Who's who?: Sorting out the e-logistics players", Logistics Management & Distribution Report, pp. E3-E9, Apr. 2001.*

(Continued)

*Primary Examiner* — John W Hayes
*Assistant Examiner* — Kevin Flynn
(74) *Attorney, Agent, or Firm* — Greenberg Traurig, LLP (57) ABSTRACT

Described herein is a method and system to provide optimizing shipping costs that can help arbitrate between a precise solution at an unreasonable cost and a reasonable solution at a very reasonable cost. In one embodiment, a first shipping option is generated to deliver shipments to a first sub-set of recipients within a first time period, and to deliver shipments to a second sub-set of recipients within a second time period that is greater than the first time period, with the shipments to the second sub-set of recipients being a greater distance than shipments to the first sub-set of recipients. The first shipping option provides a cost of shipping savings relative to shipping to all of the recipients within the first time period. The generating of the first shipping option includes selecting the second sub-set of recipients to include a quantity of recipients to provide a cost of shipping savings equal or greater to a predetermined percentage.

11 Claims, 5 Drawing Sheets

U.S. PATENT DOCUMENTS

| | | | |
|---|---|---|---|
| 5,655,008 A | 8/1997 | Futch et al. |
| 5,732,398 A | 3/1998 | Tagawa |
| 5,799,286 A | 8/1998 | Morgan et al. |
| 5,819,092 A | 10/1998 | Ferguson et al. |
| 5,832,451 A | 11/1998 | Flake et al. |
| 5,832,453 A | 11/1998 | O'Brien |
| 5,839,114 A | 11/1998 | Lynch et al. |
| 5,842,178 A | 11/1998 | Giovannoli |
| 5,852,812 A | 12/1998 | Reeder |
| 5,870,721 A | 2/1999 | Norris |
| 5,893,077 A | 4/1999 | Griffin |
| 5,897,620 A | 4/1999 | Walker et al. |
| 5,948,040 A | 9/1999 | DeLorme et al. |
| 5,987,425 A | 11/1999 | Hartman et al. |
| 5,991,742 A | 11/1999 | Tran |
| 6,018,715 A | 1/2000 | Lynch et al. |
| 6,023,679 A | 2/2000 | Acebo et al. |
| 6,029,144 A | 2/2000 | Barrett et al. |
| 6,058,375 A | 5/2000 | Park |
| 6,070,798 A | 6/2000 | Nethery |
| 6,119,094 A | 9/2000 | Lynch et al. |
| 6,195,420 B1 | 2/2001 | Tognazzini |
| 6,230,204 B1 | 5/2001 | Fleming |
| 6,295,521 B1 | 9/2001 | DeMarcken et al. |
| 6,304,850 B1 | 10/2001 | Keller et al. |
| 6,377,932 B1 | 4/2002 | DeMarcken |
| 6,411,940 B1 | 6/2002 | Egendorf |
| 6,442,526 B1 | 8/2002 | Vance et al. |
| 6,477,520 B1 | 11/2002 | Malaviya et al. |
| 6,571,213 B1 * | 5/2003 | Altendahl et al. | 705/330 |
| 6,622,084 B2 | 9/2003 | Cardno et al. |
| 6,701,311 B2 | 3/2004 | Biebesheimer et al. |
| 6,711,548 B1 | 3/2004 | Rosenblatt |
| 6,715,073 B1 | 3/2004 | An et al. |
| 6,816,882 B1 | 11/2004 | Conner et al. |
| 6,839,679 B1 | 1/2005 | Lynch et al. |
| 6,842,737 B1 | 1/2005 | Stiles et al. |
| 6,847,988 B2 | 1/2005 | Toyouchi et al. |
| 6,904,411 B2 | 6/2005 | Hinkle |
| 6,959,298 B1 | 10/2005 | Silverbrook et al. |
| 6,959,327 B1 | 10/2005 | Vogl et al. |
| 6,961,773 B2 | 11/2005 | Hartman et al. |
| 6,965,868 B1 | 11/2005 | Bednarek |
| 6,980,885 B2 * | 12/2005 | Ye et al. | 700/217 |
| 7,006,986 B1 | 2/2006 | Sines et al. |
| 7,050,986 B1 | 5/2006 | Vance et al. |
| 7,076,451 B1 | 7/2006 | Coupland et al. |
| 7,080,096 B1 | 7/2006 | Imamura |
| 7,117,170 B1 * | 10/2006 | Bennett et al. | 705/34 |
| 7,136,821 B1 | 11/2006 | Kohavi et al. |
| 7,139,728 B2 | 11/2006 | Rigole |
| 7,194,417 B1 | 3/2007 | Jones |
| 7,206,763 B2 | 4/2007 | Turk |
| 7,206,768 B1 | 4/2007 | deGroeve et al. |
| 7,222,084 B2 | 5/2007 | Archibald et al. |
| 7,228,313 B1 | 6/2007 | Hand et al. |
| 7,236,957 B2 | 6/2007 | Crosson |
| 7,272,568 B1 | 9/2007 | Birch et al. |
| 7,272,626 B2 | 9/2007 | Sahai et al. |
| 7,302,399 B1 | 11/2007 | Donovan et al. |
| 7,315,824 B2 | 1/2008 | Chen et al. |
| 7,356,516 B2 | 4/2008 | Richey et al. |
| 7,363,242 B2 | 4/2008 | Lewis et al. |
| 7,363,267 B1 | 4/2008 | Vincent et al. |
| 7,379,890 B2 | 5/2008 | Myr et al. |
| 7,388,495 B2 | 6/2008 | Fallin et al. |
| 7,401,029 B2 | 7/2008 | Gillespie |
| 7,451,106 B1 | 11/2008 | Gindlesperger |
| 7,457,950 B1 | 11/2008 | Brickell et al. |
| 7,490,122 B2 | 2/2009 | Horvitz et al. |
| 7,496,520 B1 | 2/2009 | Handel et al. |
| 7,499,864 B2 | 3/2009 | Campbell et al. |
| 7,539,620 B2 | 5/2009 | Winterton et al. |
| 7,548,615 B2 | 6/2009 | Bhalgat et al. |
| 7,562,027 B1 | 7/2009 | Baggett et al. |
| 7,574,372 B2 | 8/2009 | Among et al. |
| 7,587,370 B2 | 9/2009 | Himmelstein |
| 7,596,566 B1 | 9/2009 | Patwardhan |
| 7,599,877 B1 | 10/2009 | Cole et al. |
| 7,660,743 B1 | 2/2010 | Messa et al. |
| 2001/0003815 A1 | 6/2001 | Nakano |
| 2001/0051917 A1 | 12/2001 | Biaaonette et al. |
| 2002/0010612 A1 | 1/2002 | Smith et al. |
| 2002/0016729 A1 | 2/2002 | Breitenbach et al. |
| 2002/0059092 A1 | 5/2002 | Naito et al. |
| 2002/0095347 A1 * | 7/2002 | Cummiskey | 705/26 |
| 2002/0103693 A1 | 8/2002 | Bayer et al. |
| 2002/0111886 A1 | 8/2002 | Chenevich et al. |
| 2002/0120478 A1 | 8/2002 | Tanaka |
| 2002/0120548 A1 | 8/2002 | Etkin |
| 2002/0143677 A1 | 10/2002 | Prakash |
| 2002/0152101 A1 | 10/2002 | Lawson et al. |
| 2002/0156687 A1 | 10/2002 | Carr et al. |
| 2002/0184102 A1 | 12/2002 | Markopoulos et al. |
| 2003/0023463 A1 | 1/2003 | Dombroski et al. |
| 2003/0036930 A1 | 2/2003 | Matos et al. |
| 2003/0036981 A1 | 2/2003 | Vaughan et al. |
| 2003/0040987 A1 | 2/2003 | Hudson et al. |
| 2003/0046195 A1 | 3/2003 | Mao |
| 2003/0050879 A1 | 3/2003 | Rosen et al. |
| 2003/0078800 A1 * | 4/2003 | Salle et al. | 705/1 |
| 2003/0105711 A1 | 6/2003 | O'Neil |
| 2003/0110062 A1 | 6/2003 | Mogler et al. |
| 2003/0110136 A1 | 6/2003 | Wells et al. |
| 2003/0120477 A1 | 6/2003 | Kruk et al. |
| 2003/0120526 A1 | 6/2003 | Altman et al. |
| 2003/0149653 A1 | 8/2003 | Penney et al. |
| 2003/0177045 A1 | 9/2003 | Fitzgerald et al. |
| 2003/0182413 A1 | 9/2003 | Allen et al. |
| 2003/0191725 A1 | 10/2003 | Ratliff et al. |
| 2003/0200111 A1 * | 10/2003 | Damji | 705/1 |
| 2003/0204474 A1 | 10/2003 | Capek et al. |
| 2003/0229529 A1 | 12/2003 | Mui et al. |
| 2003/0236722 A1 | 12/2003 | Kamel |
| 2004/0002876 A1 | 1/2004 | Sommers et al. |
| 2004/0034593 A1 | 2/2004 | Toneguzzo et al. |
| 2004/0044556 A1 | 3/2004 | Brady et al. |
| 2004/0044600 A1 | 3/2004 | Chu et al. |
| 2004/0044644 A1 | 3/2004 | Brady et al. |
| 2004/0044673 A1 | 3/2004 | Brady et al. |
| 2004/0044681 A1 | 3/2004 | Brady et al. |
| 2004/0049413 A1 | 3/2004 | Momma et al. |
| 2004/0073615 A1 | 4/2004 | Darling |
| 2004/0117275 A1 | 6/2004 | Billera |
| 2004/0143498 A1 | 7/2004 | Umeda |
| 2004/0143522 A1 | 7/2004 | Wall et al. |
| 2004/0153348 A1 | 8/2004 | Garback |
| 2004/0167808 A1 | 8/2004 | Fredericks et al. |
| 2004/0193457 A1 | 9/2004 | Shogren |
| 2004/0210487 A1 | 10/2004 | Fujimoto et al. |
| 2004/0249684 A1 | 12/2004 | Karppinen |
| 2004/0249745 A1 | 12/2004 | Baaren |
| 2004/0260601 A1 | 12/2004 | Brief |
| 2004/0260603 A1 | 12/2004 | Marmotta |
| 2005/0004830 A1 | 1/2005 | Rozell et al. |
| 2005/0033614 A1 | 2/2005 | Lettovsky et al. |
| 2005/0033616 A1 | 2/2005 | Vavul et al. |
| 2005/0033631 A1 | 2/2005 | Wefers et al. |
| 2005/0043985 A1 | 2/2005 | Gillespie |
| 2005/0043996 A1 | 2/2005 | Silver |
| 2005/0060271 A1 | 3/2005 | Vig |
| 2005/0065821 A1 | 3/2005 | Kalies |
| 2005/0086088 A1 | 4/2005 | Stiles et al. |
| 2005/0108069 A1 | 5/2005 | Shiran et al. |
| 2005/0108153 A1 | 5/2005 | Thomas et al. |
| 2005/0119809 A1 | 6/2005 | Chen |
| 2005/0120052 A1 | 6/2005 | Miller et al. |
| 2005/0132006 A1 | 6/2005 | Horvitz et al. |
| 2005/0138175 A1 | 6/2005 | Kumar et al. |
| 2005/0165629 A1 * | 7/2005 | Bruns | 705/6 |
| 2005/0182713 A1 | 8/2005 | Marchesi |
| 2005/0197913 A1 | 9/2005 | Grendel et al. |
| 2005/0197915 A1 | 9/2005 | Biwer et al. |
| 2005/0216375 A1 | 9/2005 | Grendel et al. |
| 2005/0273345 A1 | 12/2005 | Castillejo |
| 2005/0283389 A1 | 12/2005 | Widjaja et al. |
| 2005/0288973 A1 | 12/2005 | Taylor et al. |

| | | | |
|---|---|---|---|
| 2006/0010023 A1 | 1/2006 | Tromczynski et al. | |
| 2006/0037016 A1 | 2/2006 | Saha et al. | |
| 2006/0059021 A1 | 3/2006 | Yulman et al. | |
| 2006/0100909 A1 | 5/2006 | Glimp et al. | |
| 2006/0101467 A1 | 5/2006 | Buco et al. | |
| 2006/0123088 A1 | 6/2006 | Simmons et al. | |
| 2006/0143087 A1 | 6/2006 | Tripp et al. | |
| 2006/0190314 A1 | 8/2006 | Hernandez | |
| 2006/0212321 A1 | 9/2006 | Vance et al. | |
| 2006/0224423 A1* | 10/2006 | Sun et al. | 705/7 |
| 2006/0241966 A1 | 10/2006 | Walker et al. | |
| 2006/0259335 A1 | 11/2006 | La Macchia et al. | |
| 2006/0283935 A1 | 12/2006 | Henry et al. | |
| 2007/0005406 A1 | 1/2007 | Assadian et al. | |
| 2007/0021991 A1 | 1/2007 | Etzioni et al. | |
| 2007/0038566 A1 | 2/2007 | Shestakov et al. | |
| 2007/0043651 A1 | 2/2007 | Xiao et al. | |
| 2007/0156546 A1 | 7/2007 | Oppert et al. | |
| 2007/0174154 A1 | 7/2007 | Roberts et al. | |
| 2007/0239548 A1 | 10/2007 | Sears | |
| 2007/0273499 A1 | 11/2007 | Chlubek et al. | |
| 2008/0004964 A1 | 1/2008 | Messa | |
| 2008/0065408 A1 | 3/2008 | Salonen | |
| 2008/0091481 A1 | 4/2008 | Messa | |
| 2008/0319808 A1 | 12/2008 | Wofford et al. | |
| 2009/0006142 A1 | 1/2009 | Orttung | |
| 2010/0191572 A1 | 7/2010 | Newman et al. | |

OTHER PUBLICATIONS

Mullen, Theo, "Services Compare Shipping Costs Instantly", InternetWeek, p. 9, Jun. 12, 2000.*

Handel, Sean et al., U.S. Appl. No. 11/187,484 entitled "System and Method for Optimization of Group Shipments to Reduce Shipping Costs," filed Jul. 22, 2005.

Aberdeen Group, Inc., "Xerox Scraps Paper for an Automated Expense Management Solution and Sees Multiple Millions in Return," Aberdeen Group OnSite: Best Practices, 2002.

Aggarwal, Gautam et al., U.S. Appl. No. 11/319,911, entitled "Method and System for Ranking Services on a Variable Scale of Compliance," filed Dec. 27, 2005.

Amadeus IT Group SA, "End to End Travel Management from Travel Booking to Expense Management," May 2, 2007.

Billington, Corey A. et al., U.S Appl. No. 11/093,615, entitled "Cost Method Analysis and breakdown for Cost Buildup," filed Mar. 29, 2005.

Business Editors, "Accenture and Captura Form Alliance to Provide Web-Enabled Expense Management Solutions," Business Wire, Aug. 13, 2001.

Datasheet, Gelco Reservation Manager 2.0, Gelco Information Network, Inc., 2003.

Extensity, Inc., "Extensity, Amadeus and e-Travel Team to Provide Integrated Travel and Expense Management Solution," Oct. 24, 2001.

Fair Isaac Corporation, "What's in Your Score," www.myfico.com, Feb. 9, 2005.

Farber, Dan, "Rearden Commerce Transforms Business Services," ZDNet, Feb. 27, 2005.

Forshaw, David et al., U.S. Appl. No. 11/324,083, entitled "Method and System to Provide Cumulative Budget and Probabilites for a Return on Expenditure for Policy Enforcement," filed Dec. 29, 2005.

Gertsbakh, Ilya et al., "Periodic transportation schedules with flexible departure time: An interactive approach based on the periodic event scheduling program and the deficit function approach," European Journal of Operational Research, Feb. 15, 1991, pp. 298-309 (abstract only).

IBM Corporation, "American Express, IBM Join Forces to Offer Easy-to-Use Online Tool for Reporting, Reconciling Business Expenses," Mar. 5, 2002.

IBM Corporation, "IBM Introduces Electronic Expense Reporting Solution to Help Companies Eliminate Reimbursement Paper Trail" Aug. 3, 1998.

Messa, Suzette et al., U.S. Appl. No. 10/966,556, entitled "System for Optimization of Cost Management," filed Oct. 15, 2004.

Orttung, Mark et al., U.S. Appl. No. 11/027,115, entitled Apparatus and Method to Provide Community Pricing, filed Dec. 30, 2004.

Orttung, Mark et al., U.S. Appl. No. 11/178,033, entitled "Flexible Policy Application to Reduce Travel Costs," filed Jul. 7, 2005.

Patwardhan, Shantau et al., U.S. Appl. No. 11/066,022, entitled System and Method for Flexible Handling of Rules and Regulations in Temporary Labor Hiring, filed Feb. 24, 2005.

Satterlee Stephens Burke & Burke, LLP, "Tax Consequences of Frequent Flyer Mileage Earned on Business Travel," located at http://www.ssbb.com/freqfly.html, May 1997.

Zhu, Guangyu et al., "Extracting Relevant Named Entities for Automated Expense Reimbursement," Proceedings of the 13th ACM SIGKDD International Conference on Knowledge Discovery and Data Mining, San Jose, CA, Aug. 2007.

* cited by examiner

FIG. 1

| | 201 | 202 | 203 |
|---|---|---|---|
| 210 { | JOHN MILLER | 1 mi | 1 |
| | JOHN DOE | 2 mi | 1 |
| | JANE DOE | 7 mi | 1 |
| | ⋮ | | |
| 211 { | JEANETTE DOE | 92 mi | 2 |
| | ⋮ | | |

SYSTEM AND METHOD FOR OPTIMIZATION OF GROUP SHIPMENTS TO REDUCE SHIPPING COSTS

CROSS-REFERENCE TO RELATED APPLICATIONS

Under 35 U.S.C. §120, this application is a continuation of U.S. patent application Ser. No. 11/187,484, filed Jul. 22, 2005, the disclosure of which is incorporated herein by reference in its entirety.

BACKGROUND OF THE INVENTION

Companies often mail identical packages, such as marketing collateral, CDs, or company information to a group of people (prospects, customers or employees). The company typically ships all these packages on the same day. In some cases, the company wants all the recipients to receive the shipments by a certain date. The recipients normally live different distances from the shipping point. To achieve the targeted delivery date, the company typically ships by the shipping method that has the least risk of missing the delivery date for the farthest recipient.

Sometimes, a handful of recipients may be classified as "outliers," i.e., they live a lot farther away than most other recipients. In these cases, the company loses money because it chooses an expensive shipping method so the farthest recipient gets the package on time. It would be cheaper if the company were to choose a slightly longer shipment method (for example, three-day instead of two-day delivery). Then the outliers would receive the shipment one day late, but the remaining recipients would receive the shipment on time. What is clearly needed is a system and method for optimizing shipping costs that can help arbitrate between a perfect solution at an unreasonable cost and a reasonable solution at a very reasonable cost.

SUMMARY OF THE INVENTION

Described herein is a method and system to provide optimizing shipping costs that can help arbitrate between a precise solution at an unreasonable cost and a reasonable solution at a very reasonable cost. In one embodiment, a method is provided to receive data related to delivering shipments to a set of recipients at separate addresses. A first shipping option is generated to deliver shipments to a first sub-set of the recipients within a first time period, and to deliver shipments to a second sub-set of recipients within a second time period that is greater than the first time period, with the shipments to the second sub-set of recipients being a greater distance than shipments to the first sub-set of recipients. The first shipping option provides a cost of shipping savings relative to shipping to all of the recipients within the first time period, wherein the generating of the first shipping option comprises selecting the second sub-set of recipients to include a quantity of recipients to provide a cost of shipping savings equal or greater to a predetermined percentage. The first shipping option is presented in a user interface to a user for selection.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

According to the novel art of this disclosure, all recipient addresses are stored in the disclosed shipping system. The administrator of said disclosed optimizer system may set up parameters indicating how many or what percent of the recipient population may be considered as outliers. The administrator may also set up parameters determining whether an optimizer may be run for certain types of shipments (for example, time-sensitive legal material would be excluded).

When the company plans a group shipment in the system, the shipment cost optimizer would determine the best shipment method (e.g., two-day or three-day) for shipping all the packages. The optimizer may also determine outliers that, when excluded, would provide lower overall shipping costs even if such a determination means delaying shipments to a couple of recipients. The system would then prompt the user with some options for reducing costs, and the user could choose to benefit from the options.

As an example, if a company is shipping packages to 100 recipients, out of which 98 live in the neighboring states and two live four states away, the optimizer would calculate the costs and can show the following message to the user: "Two of the 100 users are outliers. If they receive the package one day late, you can save $300. You can use two-day shipping for all 98 recipients and choose three-day shipping for recipient <name 1> and ground shipping for recipient <name 2>." The user could then select one of the options or ignore the message. If the user decided to follow the optimizer's recommendations, he would exclude the two recipients from the bulk mailing, ship to the two recipients separately, and save $300.

Figure 1:
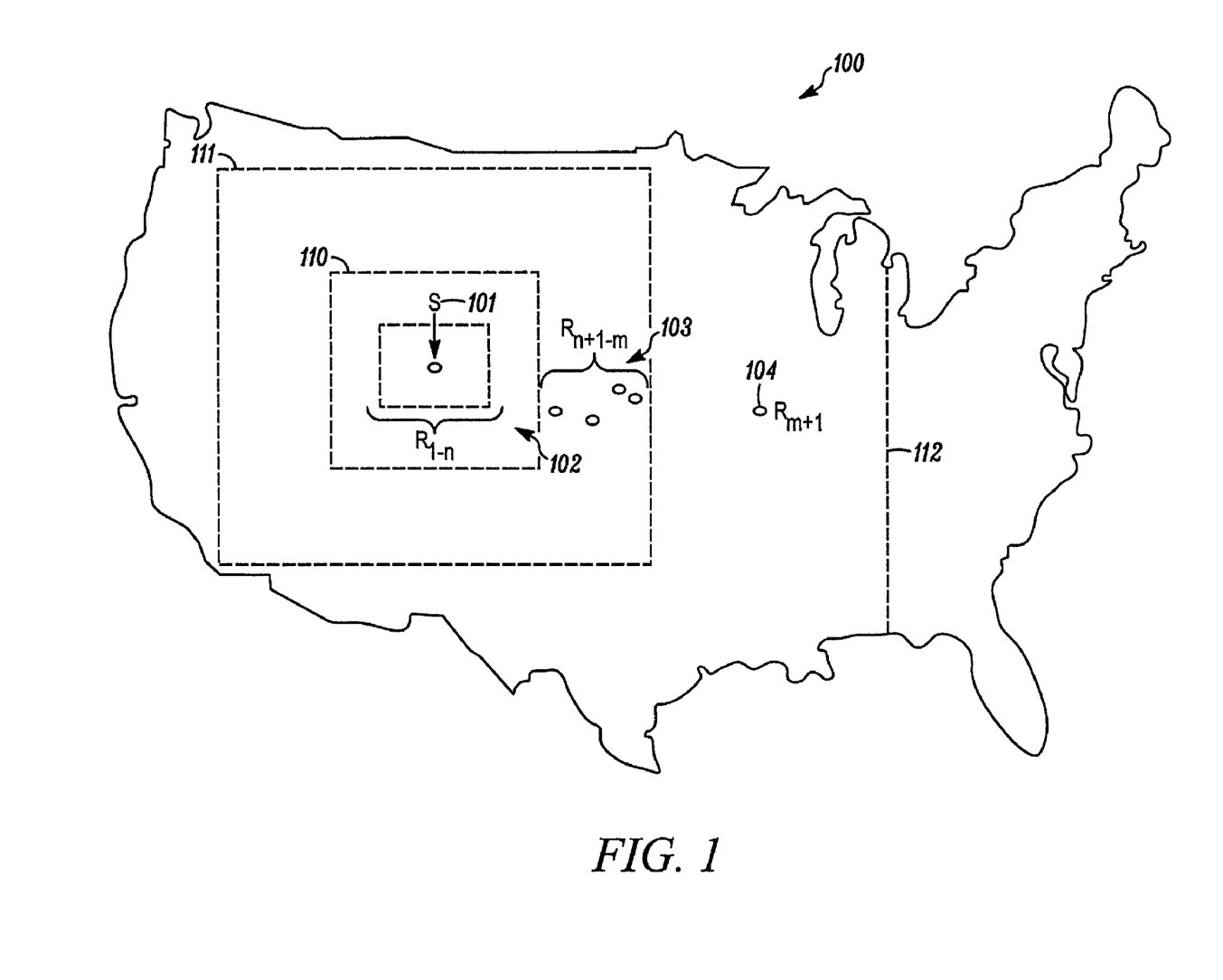
FIG. 1 shows an outline map of the United States, as an example of a shipping area with a shipping location.

FIG. 1 shows an outline map 100 of the United States, as an example of a shipping area with shipping location S 101. Most recipients R 1–n 102 in this example are in Shipping Zone 1 110. Some recipients R n+1–m are in Zone 2 111. One recipient R m+1 104 is in Zone 3 112.

Figure 2:
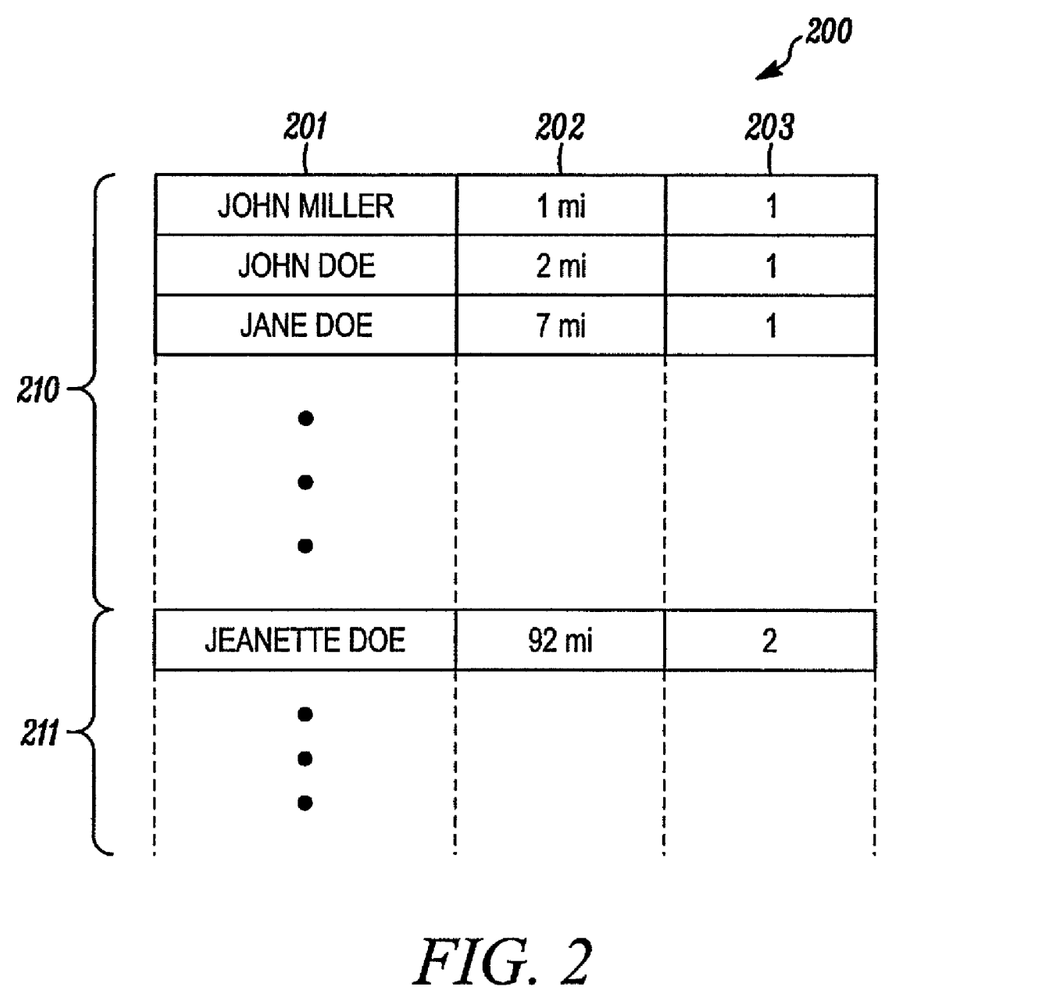
FIG. 2 shows a table that organizes the recipients by zones.

FIG. 2 shows a table 200 that organizes the recipients by zones. For example, the recipient ID is shown in column 201, and although here, for example, the ID is shown as a name, it is clear that said ID may consist of a numeric code or any of a variety of alphanumeric, symbolic, or other unique identifiers. Column 202 shows the distance from the shipping location to each recipient, and column 203 shows the zone assignment for each recipient, based on the shipping location and the recipient address. In this exemplary table the recipients are shown as being divided into two groups, 210 and 211.

Group 210 contains the majority of recipients, corresponding to recipient group 102 in FIG. 1. Recipients in this group would receive packages from shipping location 101 essentially overnight, even when packages are shipped by ground freight; whereas group 211 comprises recipients who would receive packages shipped by ground freight from shipping location 101 in two days.

Figure 3:
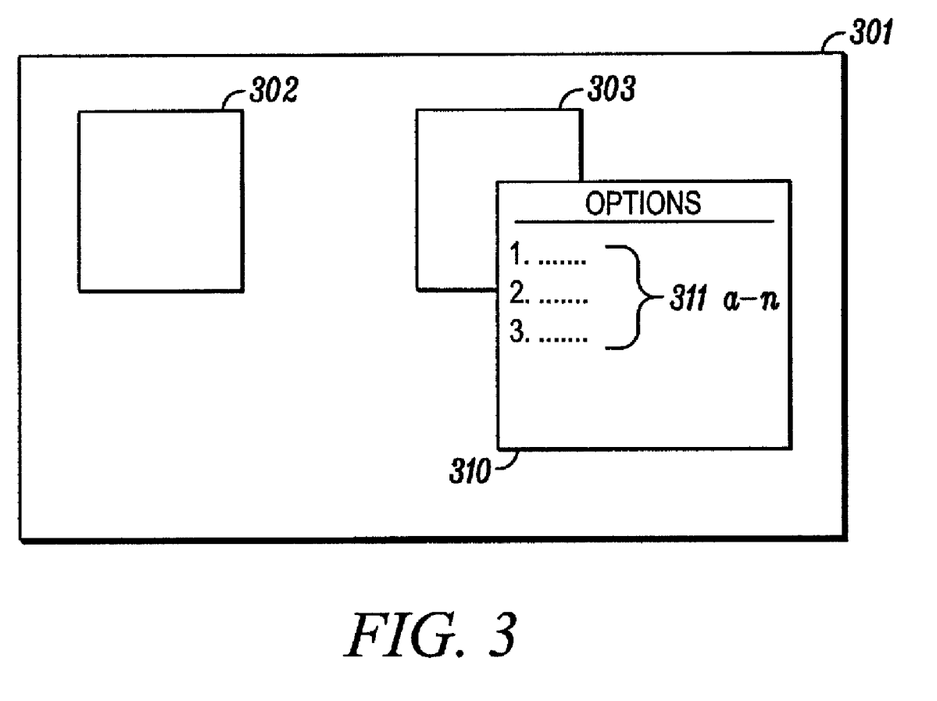
FIG. 3 shows a pop-up window that would appear during the preparation of a shipment on a user screen.

FIG. 3 shows a pop-up window 310 that would appear during the preparation of a shipment on user screen 301. Window 302 is where the user enters the selected recipients and window 303 is where the user enters information for the type of campaign, including type, number, weight and size of items to be shipped, etc. In one embodiment, when the system analyzes these entries accordingly, window 310 then provides various shipping options 311 a-n from which the user may choose.

In some cases, rich attributes may be added to the group, or to a set or sub-set of group members. For example, it would allow defining for each individual recipient, or for subgroups of the recipient's specific types or modes. These attributes could include business attributes such as the relative importance of each recipient. In addition, some recipients may be part of the organization (for example field offices, sales people, field technicians etc.) and some may be externals, such as associates, partners, customers etc. Those recipients external to the shipping organization might or sometimes should receive higher priority than those internal to the shipping organization. These attributes may also include specific service levels required in the shipping, including such items as tracking, delivery confirmation, insurance, and other such attributes. These business and shipping attributes could be combined for a given sub-group. For example, for external recipients, tracking is required, but it is not required for internal recipients. These attributes would be considered by the optimization engine as it determines the optimal carrier and service level for each recipient.

Figure 4:
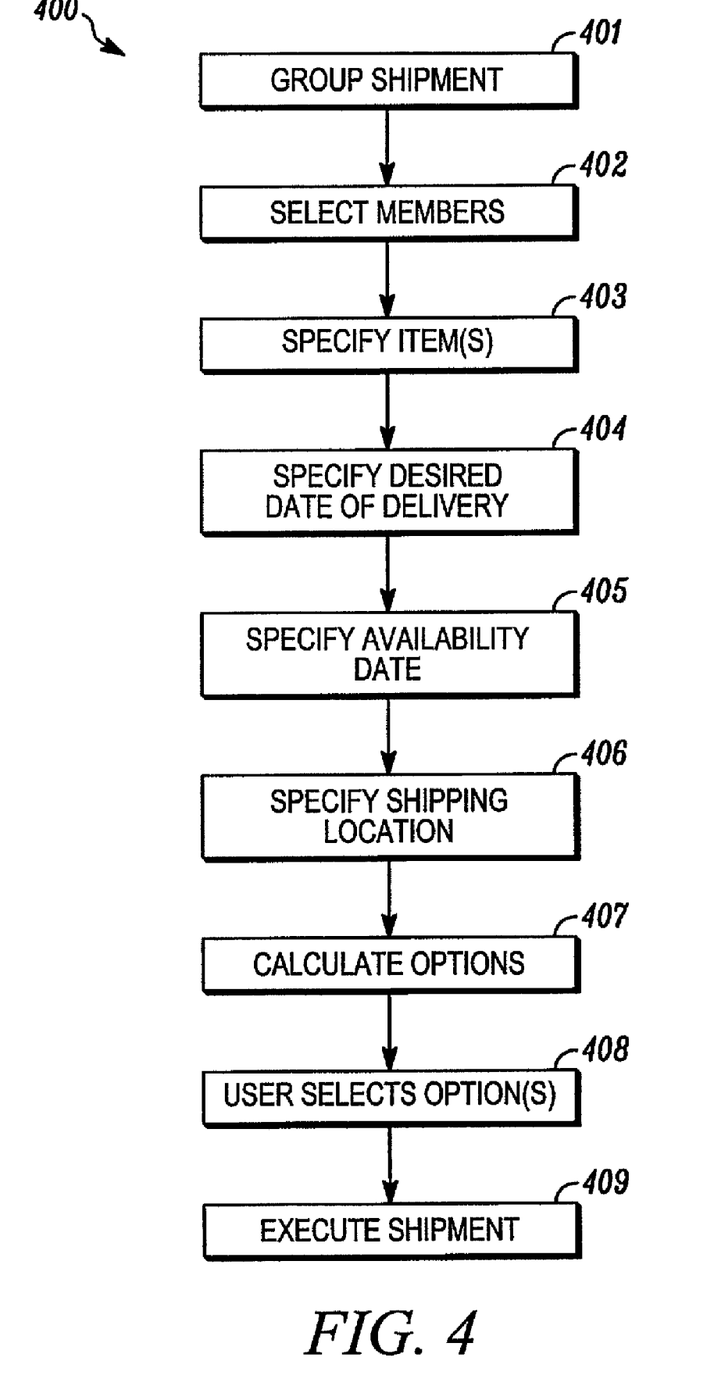
FIG. 4 shows an example process according to one embodiment of the processes used to create a pop-up window.

FIG. 4 shows an example process 400 according to one embodiment used to create pop-up window 310. Once the group shipment is selected in process 401, the group members are then selected in process 402. In process 403, details of the items to be shipped are specified, by such means, for example, as by giving the weight and dimensions of an item, or by selecting it from a list of standard items available for shipment or campaign, or entering weight, dimensions, etc. In process 404, the desired date of delivery is entered, and in process 405, the date the items will be available for shipment from shipping location 101 is entered. This date of availability may vary according to whether the item is in stock, or has to be brought in, or manufactured or assembled, etc., because said items may require delivery from the manufacturer, or they may need to be assembled or manufactured, and this information comes from the system that is used to obtain the items to be shipped. The information may be entered into the shipping optimization system automatically from an ERP or MRP system, or it may be entered manually. In process 406, the shipping location is specified, again either manually entered or entered automatically, based on the item, its manufacturer, assembly information, etc. In process 407, the shipping options are calculated, and in process 408, the user selects the preferred shipping option(s) from window 310, as described above. In process 409, the shipment is executed, which means, for example, that labels are prepared, bookings are made with shippers, and, if necessary, instructions are transmitted to the warehouse, assembly house, or other agency, to ensure that the correct items are shipped.

Figure 5:
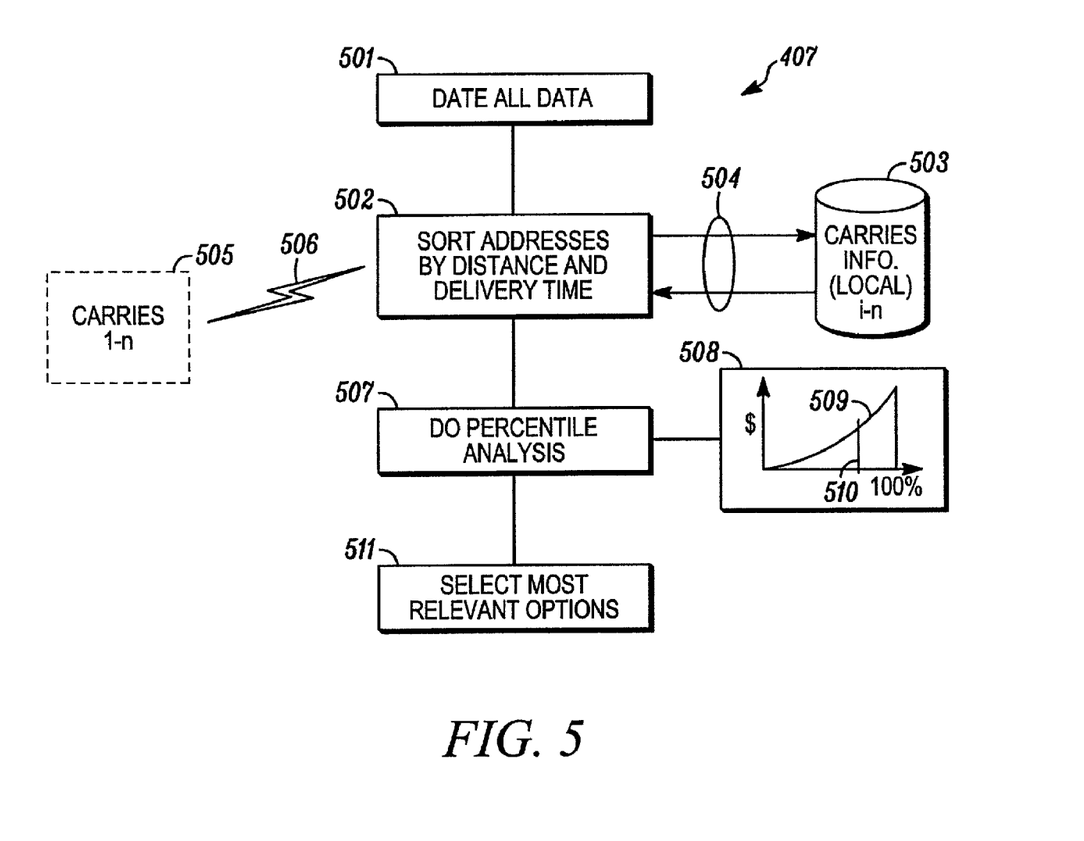
FIG. 5 describes in detail the process for generating shipping options according to one embodiment.

FIG. 5 describes in detail the method for generating shipping options 407 according to one embodiment. In process 501 all data that has been previously collected in preparation for this process is obtained from a data repository (not shown). In process 502, the system sorts addresses by distance and delivery time. These sorts may differ from carrier to carrier, because the various carriers may have different boundaries for their shipping zones. As a result, this process may need to be repeated any number of times, with different variables, such as shipping mode (ground, overnight, etc.) and specific carrier. In some cases, the information needed for carrier quotes may be available in local repository 503 and may be acquired directly by access route 504. This information may be in local storage or it may be part of the overall system as described above. In other cases, a direct inquiry may be sent over networking connection 506 to one or more carriers 505. This exemplary figure shows only one carrier, for clarity and simplicity, however it is clear that carriers 505 may comprise a large body of carriers. This inquiry may be sent directly by the system according to one embodiment, or in other cases it may be sent via the Services Platform. According to the multitude of results collected by the system, the system now performs a percentile analysis in process 507. This analysis relies on certain rules that have previously been entered into rules repository 508. A cost curve 509, with cost on the y-axis and percentage of timely delivery on the x-axis, shows the cost rising as a 100 percent shipping solution is achieved. Cut-off point 510 could be, for example, 98 percent. Two or three different methods of shipping may be used. One method is that some recipients would receive late delivery. Another method could be that only for a selected few, a more expensive overnight delivery would be used, but for the remainder, standard ground delivery would be selected, resulting in overnight delivery in the zone nearest the shipping point, or second-day air for those recipients farther away, etc. Out of the multitude of resulting possibilities, in process 511 the three to five most relevant options are presented. The factors deciding relevance would be the lowest cost, the most accurate and on-time delivery, and maybe one or two options nearby to each of those. Those options are then delivered back to process 400, which then displays them to the user.

The processes described above can be stored in a memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version. Alternatively, the logic to perform the processes as discussed above could be implemented in additional computer and/or machine readable media, such as discrete hardware components such as large-scale integrated circuits (LSIs) and application specific integrated circuits (ASICs); firmware such as electrically erasable programmable read-only memory (EEPROMs); and electrical, optical, acoustical and other forms of propagated signals (e.g., carrier waves, infrared signals, digital signals); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

It is clear that many modifications and variations of this embodiment may be made by one skilled in the art without departing from the spirit of the novel art of this disclosure.

The invention claimed is:

1. A method comprising:
   receiving data related to delivering shipments to a set of recipients at separate addresses;
   generating by a computer a first shipping option to deliver shipments to a first sub-set of the recipients within a first time period, and to deliver shipments to a second sub-set of recipients within a second time period that is greater than the first time period, shipments to the second sub-set of recipients being a greater distance than shipments to the first sub-set of recipients, and the first shipping option providing a cost of shipping savings relative to shipping to all of the recipients within the first time period, wherein the generating of the first shipping option comprises selecting the second sub-set of recipients to include a quantity of recipients to provide a cost of shipping savings equal or greater to a predetermined percentage, wherein the generating of the first shipping option further comprises generating the first shipping option to deliver shipments to the first sub-set of recipients via a first shipping method, and to deliver the shipments to the second sub-set of recipients via a second shipping method;
   presenting the first shipping option in a user interface to a user for selection;
   generating a second shipping option to deliver shipments to the first sub-set of the recipients within the first time period, and to deliver shipments to a third sub-set of recipients within a third time period that is greater than the second time period, wherein a quantity of the third sub-set of recipients is unequal to the quantity of the second sub-set of recipients, the second shipping option providing a cost savings unequal to the first shipping option; and
   providing the second shipping option to the user for selection.

2. The method of claim 1, wherein the first shipping option includes a first carrier delivering shipments to the first and second sub-set of recipients.

3. The method of claim 1, wherein the first shipping option includes a first carrier delivering shipments to the first sub-set of recipients and a second carrier delivering shipments to the second sub-set of recipients.

4. The method of claim 1, further comprising repeating the generating of the second shipping option to generate multiple shipping options to be provided to a user for selection, each shipping option providing the shipping cost savings equal to or greater than shipping to all of the recipients with the first time period, the multiple shipping options comprising one or more of different sub-set of recipients of different quantities, different time periods to deliver shipments to the different sub-set of recipients, and different shipping methods.

5. A tangible machine-readable storage medium having stored thereon a set of instructions, which when executed on a processor, cause the processor to perform a method comprising:
   receiving data related to delivering shipments to a set of recipients at separate addresses;
   generating by a computer a first shipping option to deliver shipments to a first sub-set of the recipients within a first time period, and to deliver shipments to a second sub-set of recipients within a second time period that is greater than the first time period, shipments to the second sub-set of recipients being a greater distance than shipments to the first sub-set of recipients, and the first shipping option providing a cost of shipping savings relative to shipping to all of the recipients within the first time period, wherein the generating of the first shipping option comprises selecting the second sub-set of recipients to include a quantity of recipients to provide a cost of shipping savings equal or greater to a predetermined percentage, wherein the generating of the first shipping option further comprises generating the first shipping option to deliver shipments to the first sub-set of recipients via a first shipping method, and to deliver the shipments to the second sub-set of recipients via a second shipping method;
   presenting the first shipping option in a user interface to a user for selection;
   generating a second shipping option to deliver shipments to the first sub-set of the recipients within the first time period, and to deliver shipments to a third sub-set of recipients within a third time period that is greater than the second time period, wherein a quantity of the third sub-set of recipients is unequal to the quantity of the second sub-set of recipients, the second shipping option providing a cost savings unequal to the first shipping option; and
   providing the second shipping option to a user for selection.

6. The machine-readable medium of claim 5, wherein the first shipping option includes a first carrier delivering shipments to the first and second sub-set of recipients.

7. The machine-readable medium of claim 5, wherein the first shipping option includes a first carrier delivering shipments to the first sub-set of recipients and a second carrier delivering shipments to the second sub-set of recipients.

8. The machine-readable medium of claim 5, wherein the method further comprises repeating the generating of the second option to generate multiple shipping options to be provided to a user for selection, each shipping option providing the shipping cost savings equal to or greater than shipping to all of the recipients with the first time period, the multiple shipping options comprising one or more of different sub-set of recipients of different quantities, different time periods to deliver shipments to the different sub-set of recipients, and different shipping methods.

9. A system comprising:
   a processor configured to receive data related to delivering shipments to a set of recipients at separate addresses;
   wherein the processor is further configured to generate a first shipping option to deliver shipments to a first sub-set of the recipients within a first time period, and to deliver shipments to a second sub-set of recipients within a second time period that is greater than the first time period, shipments to the second sub-set of recipients being a greater distance than shipments to the first sub-set of recipients, and the first shipping option providing a cost of shipping savings relative to shipping to all of the recipients within the first time period, and wherein the processor is further configured to select the second sub-set of recipients to include a quantity of recipients to provide a cost of shipping savings equal or greater to a predetermined percentage, wherein the processor is further configured to generate a second shipping option to deliver shipments to the first sub-set of the recipients within the first time period, and to deliver shipments to a third sub-set of recipients within a third time period that is greater than the second time period, wherein a quantity of the third sub-set of recipients is unequal to a quantity of the second sub-set of recipients, the second shipping option providing a cost savings unequal to the first shipping option; and a display to present the first shipping option in a user interface to a user for selection.

10. The system of claim 9, wherein the processor is further configured to generate the first shipping option to deliver shipments to the first sub-set of recipients via a first shipping method, and to deliver the shipments to the second sub-set of recipients via a second shipping method.

11. The system of claim 10, wherein the processor is further configured to generate multiple shipping options to be provided to a user for selection, each shipping option providing the shipping cost savings equal to or greater than shipping to all of the recipients with the first time period, the multiple shipping options comprising one or more of different sub-set of recipients of different quantities, different time periods to deliver shipments to the different sub-set of recipients, and different shipping methods.

* * * * *